United States Patent
Hara et al.

(10) Patent No.: US 10,668,972 B2
(45) Date of Patent: Jun. 2, 2020

(54) SADDLE RIDING TYPE VEHICLE

(71) Applicant: YAMAHA HATSUDOKI KABUSHIKI KAISHA, Iwata-shi, Shizuoka (JP)

(72) Inventors: Nobuo Hara, Shizuoka (JP); Yu Shibuya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/128,467

(22) PCT Filed: Mar. 16, 2015

(86) PCT No.: PCT/JP2015/057735
§ 371 (c)(1),
(2) Date: Sep. 23, 2016

(87) PCT Pub. No.: WO2015/146680
PCT Pub. Date: Oct. 1, 2015

(65) Prior Publication Data
US 2017/0106930 A1    Apr. 20, 2017

(30) Foreign Application Priority Data
Mar. 24, 2014 (JP) ................. 2014-060199

(51) Int. Cl.
*B60G 17/015*    (2006.01)
*B62K 5/10*    (2013.01)
(Continued)

(52) U.S. Cl.
CPC .............. *B62K 5/10* (2013.01); *B60G 17/015* (2013.01); *B62J 99/00* (2013.01); *B62K 5/027* (2013.01);
(Continued)

(58) Field of Classification Search
CPC . B62K 5/10; B62K 5/027; B62K 5/05; B62K 5/08; B62K 23/02; B62K 21/12;
(Continued)

(56) References Cited

U.S. PATENT DOCUMENTS 4,719,984 A * 1/1988 Watanabe ............... B60T 1/062
                                                     180/215
4,781,258 A * 11/1988 Tamura .................. B60K 11/06
                                                     180/229
(Continued)

FOREIGN PATENT DOCUMENTS

EP    2 127 920 A1    12/2009
FR    2 995 255 A1    3/2014
(Continued)

OTHER PUBLICATIONS

Official Communication issued in International Patent Application No. PCT/JP2015/057735, dated Jun. 9, 2015.

*Primary Examiner* — Barry Gooden, Jr.
(74) *Attorney, Agent, or Firm* — Keating and Bennett, LLP

(57) ABSTRACT

A saddle riding type vehicle includes left and right front wheels that unlock a linkage more surely when the vehicle starts. The vehicle includes a linkage that connects the left and right front wheels to a vehicle body frame, a lock that locks or unlocks the linkage, a lock controller that controls the lock, a wheel speed sensor that detects a vehicle speed, and a vehicle speed change rate obtainer that obtains a vehicle speed change rate. The lock controller unlocks the linkage via the lock if the linkage is locked by the lock and at least one of the vehicle speed and the vehicle speed change rate satisfies an unlocking condition.

7 Claims, 7 Drawing Sheets

(51) Int. Cl.
  *B62K 5/05* (2013.01)
  *B62K 5/027* (2013.01)
  *B62J 99/00* (2020.01)
  *B62K 5/08* (2006.01)
  *B62K 23/02* (2006.01)
  *B62K 5/00* (2013.01)
  *B62J 45/00* (2020.01)
  *B62J 45/40* (2020.01)
  *B62K 21/12* (2006.01)

(52) U.S. Cl.
  CPC .............. *B62K 5/05* (2013.01); *B62K 5/08* (2013.01); *B62K 23/02* (2013.01); *B60Y 2200/122* (2013.01); *B62J 45/00* (2020.02); *B62J 45/40* (2020.02); *B62K 21/12* (2013.01); *B62K 2005/001* (2013.01)

(58) Field of Classification Search
  CPC ........... B62K 2005/001; B62K 2207/00; B62J 99/00; B62J 2099/002; B62J 2099/004; B60Y 2200/122; B60G 17/015; B60G 17/01908; B60G 17/01933
  See application file for complete search history.

(56) References Cited

U.S. PATENT DOCUMENTS

| | | | |
|---|---|---|---|
| 4,787,470 A * | 11/1988 | Badsey | B62D 61/065 180/210 |
| 4,826,057 A * | 5/1989 | Yamada | B62J 7/04 180/215 |
| 5,094,315 A * | 3/1992 | Taki | B62J 35/00 180/219 |
| 6,268,794 B1 * | 7/2001 | Tzanev | B62J 6/005 340/427 |
| 6,763,905 B2 * | 7/2004 | Cocco | B60G 21/007 180/210 |
| D547,242 S * | 7/2007 | Lambri | B62K 5/10 D12/110 |
| 7,243,765 B2 * | 7/2007 | Marcacci | B60G 15/063 188/300 |
| 7,264,251 B2 * | 9/2007 | Marcacci | B60G 17/0152 280/124.103 |
| D598,328 S * | 8/2009 | Lambri | B62K 5/05 D12/110 |
| 7,648,148 B1 * | 1/2010 | Mercier | B60G 21/007 180/210 |
| 8,991,542 B2 * | 3/2015 | Yu | B62K 5/027 180/209 |
| 2002/0007977 A1 * | 1/2002 | Ishii | B62J 17/00 180/219 |
| 2002/0190494 A1 * | 12/2002 | Cocco | B60G 7/00 280/124.134 |
| 2004/0227321 A1 * | 11/2004 | Kuroki | B60G 3/02 280/124.135 |
| 2005/0012291 A1 * | 1/2005 | Bagnoli | B62K 5/05 280/124.103 |
| 2005/0167174 A1 | 8/2005 | Marcacci | |
| 2005/0167217 A1 * | 8/2005 | Marcacci | B60G 15/063 188/300 |
| 2006/0065456 A1 * | 3/2006 | Noda | B62K 11/04 180/219 |
| 2007/0075517 A1 * | 4/2007 | Suhre | B60G 3/20 280/124.134 |
| 2007/0199761 A1 * | 8/2007 | Seki | B62K 5/01 180/312 |
| 2007/0262548 A1 * | 11/2007 | Rawlinson | B60G 21/007 280/124.103 |
| 2009/0107754 A1 * | 4/2009 | Doperalski | B62K 5/027 180/337 |
| 2009/0299565 A1 | 12/2009 | Hara et al. | |
| 2010/0147615 A1 * | 6/2010 | Tsujii | B60G 3/145 180/215 |
| 2010/0206657 A1 | 8/2010 | Makabe | |
| 2012/0181783 A1 * | 7/2012 | Nakano | B62K 11/10 280/834 |
| 2013/0168944 A1 * | 7/2013 | Bartolozzi | B60G 3/01 280/269 |
| 2013/0247881 A1 * | 9/2013 | Okubo | F02M 25/06 123/519 |
| 2013/0248273 A1 * | 9/2013 | Nakamura | F28D 1/00 180/229 |
| 2014/0204598 A1 * | 7/2014 | Di Tanna | B60Q 1/12 362/460 |
| 2014/0244109 A1 * | 8/2014 | Tetsuka | B60Q 1/40 701/36 |
| 2015/0158540 A1 * | 6/2015 | Hara | B62K 11/10 180/219 |
| 2015/0166139 A1 * | 6/2015 | Inomori | B62K 11/04 180/219 |
| 2016/0056482 A1 * | 2/2016 | Otsuka | B60L 11/1898 180/220 |
| 2016/0090141 A1 * | 3/2016 | Mizukura | B62J 35/00 180/219 |
| 2016/0107713 A1 * | 4/2016 | Takano | B62K 5/027 180/210 |
| 2016/0114850 A1 * | 4/2016 | Takano | B62K 11/04 180/210 |
| 2016/0280305 A1 * | 9/2016 | Takada | B62K 11/10 |
| 2016/0375948 A1 * | 12/2016 | Takenaka | B62K 5/10 280/5.506 |
| 2017/0101150 A1 * | 4/2017 | Shibuya | B62J 99/00 |
| 2017/0106935 A1 * | 4/2017 | Hara | B62K 5/10 |
| 2017/0106936 A1 * | 4/2017 | Shibuya | B62K 5/027 |

FOREIGN PATENT DOCUMENTS

| | | |
|---|---|---|
| JP | 2005-313876 A | 11/2005 |
| JP | 2006-341837 A | 12/2006 |
| JP | 2009-286266 A | 12/2009 |
| JP | 2010-184690 A | 8/2010 |
| JP | 2011-042199 A | 3/2011 |
| JP | 2012-025370 A | 2/2012 |
| JP | 2012-081784 A | 4/2012 |
| JP | 2013-112234 A | 6/2013 |
| JP | 2013-244763 A | 12/2013 |
| WO | 02/068228 A1 | 9/2002 |
| WO | 2009/059099 A2 | 5/2009 |

* cited by examiner

SADDLE RIDING TYPE VEHICLE

BACKGROUND OF THE INVENTION

1. Field of the Invention

The present invention relates to a saddle riding type vehicle including a linkage that connects left and right front wheels to a vehicle body frame and a lock used to lock or unlock the linkage.

2. Description of the Related Art

As disclosed in JP 2005-313876 A, a known three-wheeled vehicle including left and right front wheels includes a linkage that connects the left and right front wheels to a vehicle body frame. The arrangement disclosed in JP 2005-313876 A includes an anti-roll device that stops operation of the linkage.

The anti-roll device disclosed in JP 2005-313876 A includes a quarter-circular brake disk provided integrally with one element of the linkage and a caliper attached to the vehicle body frame. In the anti-roll device, the brake disk is held by the caliper in order to fix the brake disk to the vehicle body frame. This stops the operation of the linkage, so that the roll motion of the vehicle is stopped.

A known arrangement in a three-wheeled vehicle including such an anti-roll device takes into consideration a throttle opening degree, an engine speed, and a vehicle speed as a condition to lock the brake disk using the caliper. If these values satisfy a prescribed condition, it is determined that the three-wheeled vehicle is stopped or is immediately before stopping and the anti-roll device is activated.

Note that in the above-described arrangement, a throttle opening degree, an engine speed, and a vehicle speed are taken into consideration when the caliper is unlocked. In other words, if the starting of the three-wheeled vehicle is detected based on any of the throttle opening degree, the engine speed, and the vehicle speed, the caliper is unlocked. More specifically, if the throttle opening degree is more than a threshold, the caliper is unlocked. If the engine speed is more than a threshold, the caliper is unlocked. If the vehicle speed is more than a threshold, the caliper is unlocked.

As described above, in the arrangement including the device used to lock the linkage, if the throttle opening degree or the engine speed is used as the unlocking condition and these values are increased as the vehicle starts, the linkage is unlocked when the vehicle starts. However, the vehicle may start without increasing the throttle opening degree or the engine speed, for example, on a downward slope. If the vehicle speed is also included as the unlocking condition, the threshold may be set to a relatively large value so that the linkage is not unlocked while the rider walks the vehicle. In this case, if the vehicle starts without increasing the throttle opening degree or the engine speed, the linkage is not unlocked until the vehicle speed reaches the threshold.

SUMMARY OF THE INVENTION

Preferred embodiments of the present invention provide a saddle riding type vehicle that is able to unlock a linkage before the vehicle speed reaches an unlocking condition even if the vehicle starts without increasing the throttle opening degree or the engine speed.

A saddle riding type vehicle according to a preferred embodiment of the present invention includes an engine, a vehicle body frame, left and right front wheels, a linkage that connects the left and right front wheels to the vehicle body frame, a lock that locks the linkage by preventing operation of the linkage and unlocks the linkage by allowing the linkage to operate, a lock controller configured or programmed to control locking and unlocking of the linkage via the lock, a vehicle speed detector that detects a vehicle speed, and a vehicle speed change rate obtainer that obtains a vehicle speed change rate. The lock controller unlocks the linkage via the lock if the linkage is locked by the lock and at least one of the vehicle speed detected by the vehicle speed detector and the vehicle speed change rate obtained by the vehicle speed change rate obtainer satisfies an unlocking condition.

When the linkage is unlocked, not only the vehicle speed but also the vehicle speed change rate is taken into consideration, unlocking may be carried out by a different method from a conventional method. As for the vehicle speed as the unlocking condition, the threshold may be set to a relatively large value so that the linkage is not unlocked while the rider walks the vehicle. In this case, the linkage is not unlocked until the vehicle speed reaches the threshold when the vehicle starts to travel without increasing the throttle opening degree or the engine speed on a downward slope. In contrast, the vehicle speed change rate as well as the vehicle speed is taken into consideration as the unlocking condition, and the linkage is unlocked when the vehicle speed change rate satisfies the unlocking condition even before the vehicle speed satisfies the unlocking condition.

Therefore, the linkage is unlocked more quickly when the vehicle starts to travel than the conventional method of determining whether or not to unlock the linkage based on the vehicle speed, and the linkage is unlocked quickly if the vehicle starts on a downward slope.

According to a preferred embodiment of the present invention, the unlocking condition is satisfied if the vehicle speed change rate is equal to or more than a prescribed value. The lock controller unlocks the linkage via the lock if the linkage is locked by the lock and the vehicle speed change rate obtained by the vehicle speed change rate obtainer is equal to or more than the prescribed value.

The linkage is unlocked by the lock if the vehicle speed change rate is equal to or more than the prescribed value, so that the linkage is unlocked when the vehicle starts.

According to a preferred embodiment of the present invention, the vehicle speed change rate obtainer outputs a difference between a vehicle speed detected by the vehicle speed detector at a first time point and a vehicle speed detected by the vehicle speed detector at a second time point, or a derivative value of a vehicle speed detected by the vehicle speed detector as the vehicle speed change rate.

In this way, the vehicle speed change rate is easily obtained.

According to a preferred embodiment of the present invention, the saddle riding type vehicle further includes a throttle opening degree detector that detects a value corresponding to a throttle opening degree of the engine. The lock controller unlocks the linkage via the lock if the lock controller is locked by the lock and the value corresponding to the throttle opening degree detected by the throttle opening degree detector satisfies the unlocking condition.

When the unlocking condition is based on the vehicle speed, the threshold may be set to a relatively large value so that the linkage is not unlocked while the rider walks the vehicle. If the unlocking condition is based only on the vehicle speed, the linkage is not unlocked until the vehicle speed reaches the threshold even if the rider operates the throttle grip to raise the engine speed and the vehicle starts to travel. In contrast, when the throttle opening degree is also taken into consideration during unlocking the linkage as described above, the linkage may be unlocked when the rider operates the throttle grip. Therefore, the linkage is unlocked before the vehicle speed reaches the threshold.

Furthermore, the linkage is unlocked in consideration of a value corresponding to the throttle opening degree, and unlocking is carried out before the acceleration increases, for example, as the vehicle starts.

According to a preferred embodiment of the present invention, the saddle riding type vehicle further includes a throttle opening degree detector that detects a value corresponding to the throttle opening degree of the engine. The lock controller locks the linkage via the lock if the linkage is unlocked and the value corresponding to the throttle opening degree detected by the throttle opening degree detector, the vehicle speed detected by the vehicle speed detector, and the vehicle speed change rate obtained by the vehicle speed change rate obtainer satisfy a locking condition.

The linkage is locked if the value corresponding to the throttle opening degree, the vehicle speed, and the vehicle speed change rate all satisfy the locking condition, so that when, for example, the vehicle speed of the three-wheeled vehicle gradually increases on a downward slope, the linkage is prevented from being locked unless the vehicle speed change rate in addition to the value corresponding to the throttle opening degree and the vehicle speed satisfies the locking condition.

According to a preferred embodiment of the present invention, the saddle riding type vehicle further includes an instruction generator that outputs an instruction signal that instructs unlocking of the linkage by the lock to the lock controller. The lock controller unlocks the linkage via the lock in response to the instruction signal input from the instruction generator if the linkage is in a locked state.

The linkage is unlocked by the lock in response to the instruction signal output from the instruction generator. Therefore, the linkage is unlocked based on an instruction from the rider.

According to a preferred embodiment of the present invention, the saddle riding type vehicle further includes an instruction generator that outputs an instruction signal that instructs locking of the linkage by the lock to the lock controller. The lock controller locks the linkage via the lock in response to a transition from a state in which none of the vehicle speed change rate, the value corresponding to the throttle opening degree, and the vehicle speed satisfies the locking condition to a state in which all of them satisfy the locking condition while the linkage is in an unlocked state and the instruction signal is input from the instruction generator.

In this way, the linkage is locked when the vehicle speed change rate, the throttle opening degree, and the vehicle speed satisfy the locking condition while an input instruction is carried out by the instruction generator without having to determine whether the vehicle speed change rate, the throttle opening degree, and the vehicle speed satisfy the locking condition. More specifically, the rider inputs an instruction by the instruction generator in advance, so that the linkage is locked when these values satisfy the locking condition. Therefore, in this way, the linkage is locked quickly as compared to the case of inputting the instruction by the instruction generator after determining that the values satisfy the locking condition.

According to a preferred embodiment of the present invention, the saddle riding type vehicle further includes a damper that damps vibrations in opposite phases in the left and right front wheels. The lock is configured so that it is able to lock operation of the damper.

In this way, using the damper that damps vibrations in opposite phases in the left and right front wheels, the lock is able to lock operation of the linkage. Since an additional lock is not necessary, the three-wheeled vehicle is compact and inexpensive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
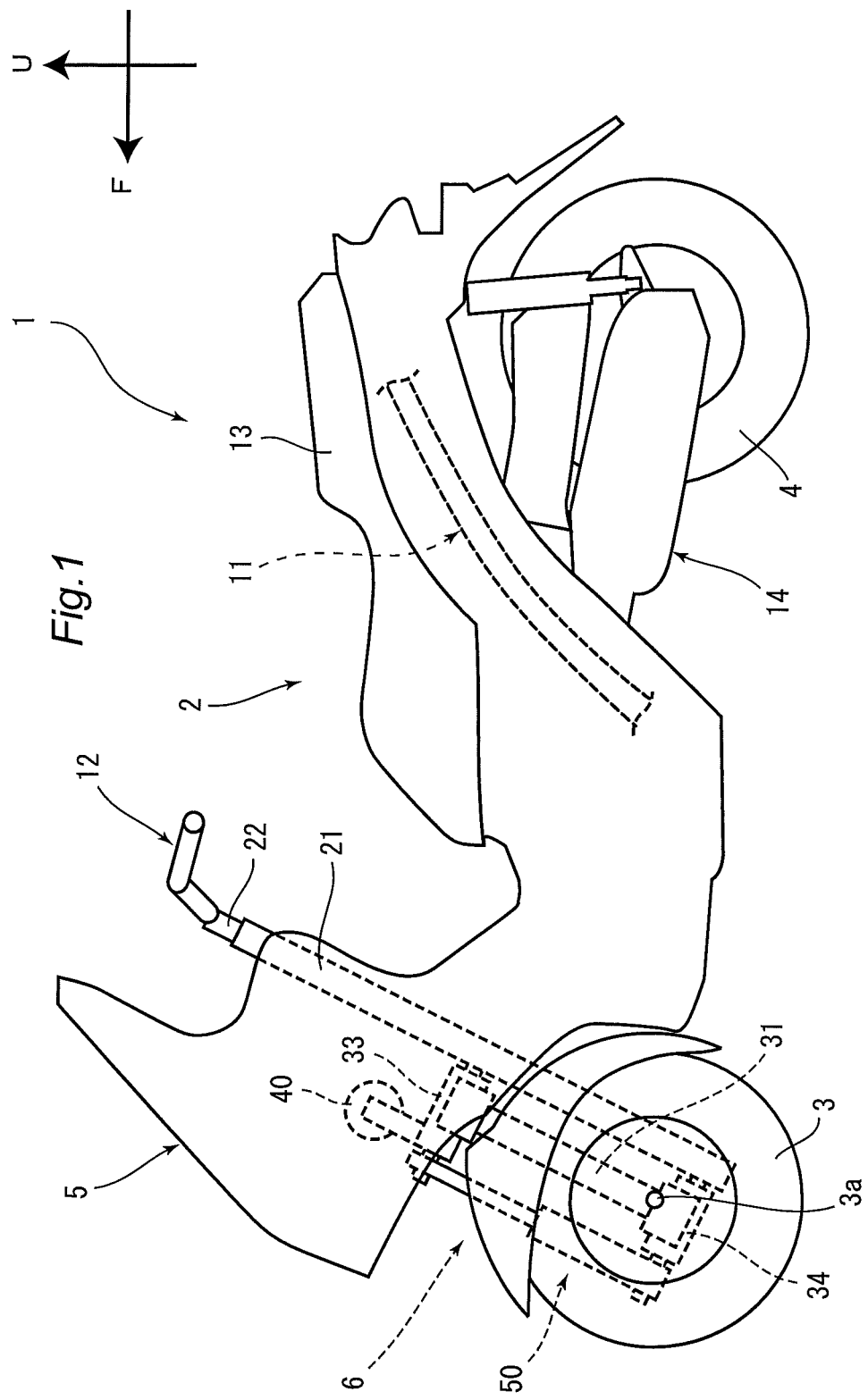
FIG. 1 is a left side view of a general structure of a three-wheeled vehicle according to a preferred embodiment of the present invention.

In the following, preferred embodiments of the present invention will be described in conjunction with the accompanying drawings. Note that the elements in the drawings are not drawn faithfully to their actual sizes or to scale.

In the following description, forward, rearward, leftward, or rightward refer to these directions as seen by the rider behind a handle 12 and seated on a seat 13 of a three-wheeled vehicle 1.

FIG. 1 is a left side view of a general structure of the three-wheeled vehicle 1 (saddle riding type vehicle) according to a preferred embodiment of the present invention. The three-wheeled vehicle 1 includes a vehicle main body 2, left and right front wheels 3 provided at a front portion of the vehicle main body 2, and one rear wheel 4 provided at a rear portion of the vehicle main body 2. Note that the arrow F in FIG. 1 indicates a forward direction of the three-wheeled vehicle 1 and the arrow U indicates an upward direction of the three-wheeled vehicle 1.

The vehicle main body 2 includes a vehicle body frame 11, a vehicle body cover 5, the handle 12, the seat 13, and a power unit 14. The vehicle main body 2 includes a front wheel support 6 that will be described.

The vehicle body frame 11 includes a head pipe 21. The head pipe 21 is provided at a front portion of the three-wheeled vehicle 1. The head pipe 21 is connected with a main frame that extends in a rearward direction of the vehicle and a down frame that extends in a downward direction of the vehicle below the main frame, though not specifically shown in the drawings.

A steering shaft 22 is provided in the head pipe 21. The handle 12 is connected at an upper portion of the steering shaft 22 so that it is able to rotate relative to the head pipe 21. The head pipe 21 is connected with the front wheel support 6 at a front portion of the vehicle. Note that the steering shaft 22 is connected to a left knuckle arm 31 and a right knuckle arm 32 of the front wheel support 6 that will be described below, though not specifically shown in the drawings. As will be described, the left and right front wheels 3 are supported rotatably by the left and right knuckle arms 31 and 32. Therefore, as the steering shaft 22 is rotated, the left and right front wheels 3 rotate in a plan view.

The vehicle body frame 11 including the above-described structure is covered with a vehicle body cover 5. The vehicle body cover 5 is made, for example, of a resin material. Details of the vehicle body cover 5 will not be described.

Figure 2:
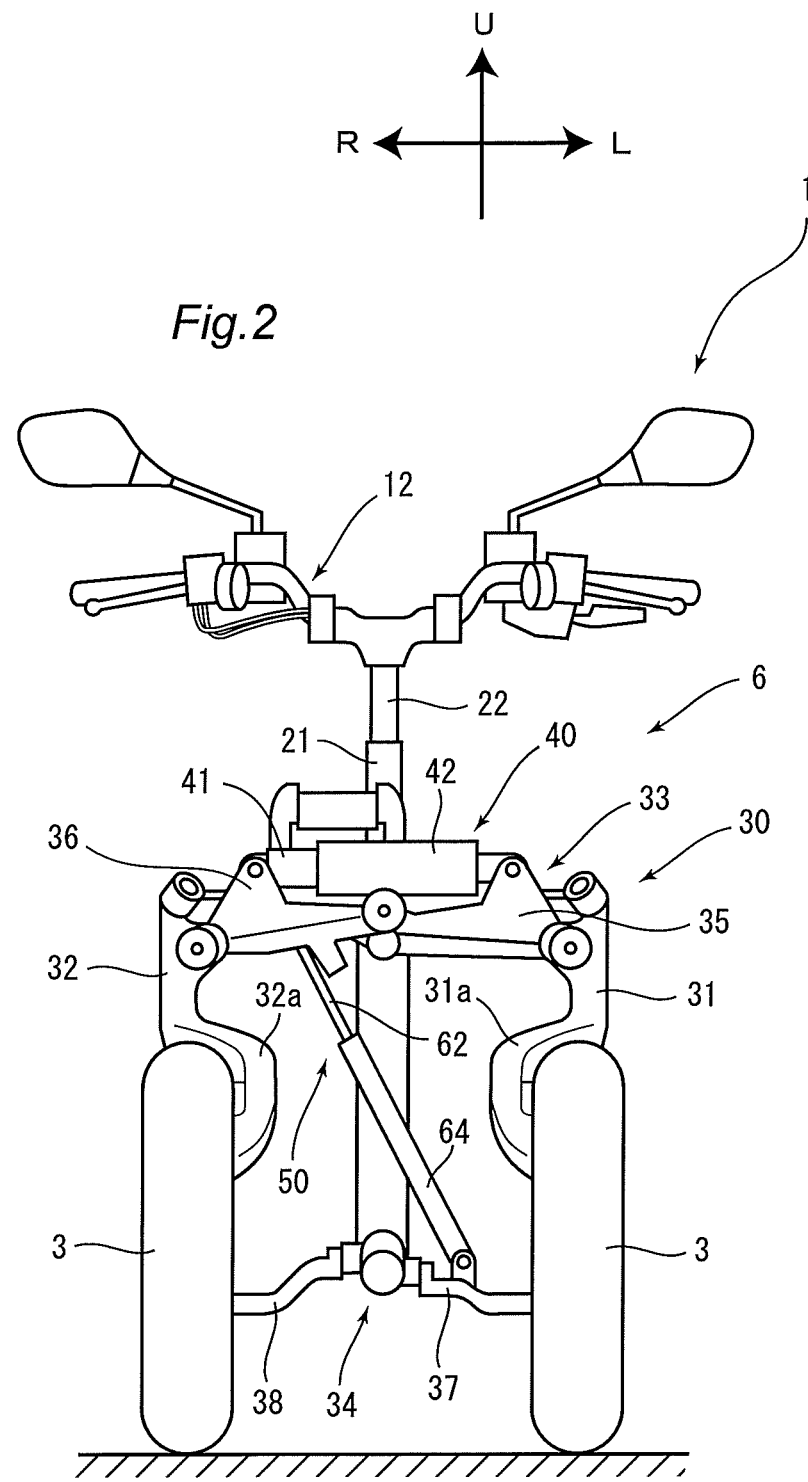
FIG. 2 is a view of a front portion of a vehicle main body of the three-wheeled vehicle with a vehicle body cover removed when it is viewed from the front of the vehicle.

As shown in FIG. 2, the left and right front wheels 3 are supported rotatably by the left and right knuckle arms 31 and 32 of the front wheel support 6. More specifically, the left and right front wheels 3 are provided on the left and right sides of the front wheel support 6 so that the front wheel support 6 connected to the head pipe 21 is located between the wheels.

The rear wheel 4 includes the same structure as that of a conventional motorcycle and therefore will not be described in detail. The structure of the power unit 14 including an engine, a driving power transmission, and other elements is preferably the same as that of a power unit in a conventional motorcycle and will not be described in detail.

Now, a structure of the front wheel support 6 that connects the left and right front wheels 3 to the head pipe 21 will be described in detail by referring to FIGS. 1 and 2.

The front wheel support 6 includes a linkage 30, a suspension 40, and a damper 50. The linkage 30 is supported rotatably relative to the head pipe 21 as seen from the front of the vehicle. As seen from above the vehicle, the left and right front wheels 3 are attached on the left and right of the linkage 30. More specifically, the linkage 30 includes a link structure that connects the left and right front wheels 3 and the head pipe 21. The suspension 40 is attached to the linkage 30 so that it damps vibrations in the same phase generated in the left and right front wheels 3. The damper 50 is attached to the linkage 30 so that it damps vibrations in opposite phases generated in the left and right front wheels 3. Arrangements related to the suspension 40 and the damper 50 will be described below.

The linkage 30 includes left and right knuckle arms 31 and 32 positioned at left and right portions of the vehicle, an upper arm 33 that connects upper portions of the left and right knuckle arms 31 and 32 to the head pipe 21, and a lower arm 34 that connects lower portions of the left and right knuckle arms 31 and 32 to the head pipe 21.

The left and right knuckle arms 31 and 32 include lower ends connected to the left and right front wheels 3, respectively. In other words, the left and right front wheels 3 are supported rotatably at the lower ends of the left and right knuckle arms 31 and 32, respectively.

The left and right knuckle arms 31 and 32 define a symmetrical or substantially symmetrical shape. The left and right knuckle arms 31 and 32 also define a symmetrical or substantially symmetrical connection to the front wheels 3 and the upper and lower arms 33 and 34. Therefore, only the left knuckle arm 31 will be described below.

The left knuckle arm 31 includes a curved portion 31a at its vertical center portion that extends in the vertical direction and projects toward the inside of the vehicle. The left knuckle arm 31 is connected to the upper arm 33 in a rotatable manner at its upper portion above the curved portion 31a. The left knuckle arm 31 is arranged so that the curved portion 31a extends radially across an inner portion of the tire of the front wheel 3 in the vehicle widthwise direction. The axle 3a (see FIG. 1) of the front wheel 3 is rotatably connected to a portion of the left knuckle arm 31 below the curved portion 31a. Here, the front wheel 3 includes a tubular or substantially tubular wheel with a bottom and a rubber tire fitted to the outer edge of the wheel.

Note that in FIG. 2, 32a refers to a curved portion of the right knuckle arm 32. The curved portion 32a is positioned to radially cross the inner portion of the tire of the front wheel 3 in the vehicle widthwise direction similarly to the curved portion 31a of the left knuckle arm 31.

The upper arm 33 includes an upper left arm 35 connected to the left knuckle arm 31 in a rotatable manner and an upper right arm 36 connected to the right knuckle arm 32 in a rotatable manner. The upper left arm 35 and the upper right arm 36 are rotatably connected to the head pipe 21. In this way, the upper left arm 35 and the upper right arm 36 rotate independently relative to the head pipe 21 and also rotate relative to the left and right knuckle arms 31 and 32.

The lower arm 34 includes a lower left arm 37 connected to the left knuckle arm 31 in a rotatable manner and a lower right arm 38 connected to the right knuckle arm 32 in a rotatable manner. Similarly to the upper left arm 35 and the upper right arm 36 described above, the lower left arm 37 and the lower right arm 38 are rotatably connected to the head pipe 21. In this way, the lower left arm 37 and the lower right arm 38 rotate relative to the head pipe 21 independently and also rotate relative to the left and right knuckle arms 31 and 32.

As described above, the linkage 30 according to the present preferred embodiment is preferably a so-called double wishbone structure, for example, in which the arms 35 to 38 independently move up and down in the upper and lower arms 33 and 34.

A suspension 40 is attached to an upper portion of the upper arm 33 that defines a portion of the linkage 30 so that the suspension connects the upper left arm 35 and the upper right arm 36. As shown in FIG. 2, the suspension 40 is parallel or substantially parallel to the upper arm 33.

The suspension 40 includes a columnar piston 41 and a cylinder 42. Although not specifically shown, the piston 41 includes a piston main body that partitions the internal space of the cylinder 42 into two at one longitudinal end of the piston rod. The piston 41 is arranged so that the piston main body provided at one longitudinal end thereof is positioned in the cylinder 42 and is able to move in the cylinder 42 in the tube axis direction. Operating oil (fluid) is filled within the cylinder 42. As the piston 41 moves in the cylinder 42, a damping force is obtained in the suspension 40.

The other end of the piston 41 positioned outside the cylinder 42 is connected to the upper right arm 36 in a rotatable manner. The side of the cylinder 42 opposite to the side including the piston 41 inserted therein is connected to the upper left arm 35 in a rotatable manner.

In this way, the piston 41 of the suspension 40 moves relative to the cylinder 42 based on relative displacement between the upper left arm 35 and the upper right arm 36. Therefore, the suspension 40 damps vibrations that may cause relative displacement between the upper left arm 35 and the upper right arm 36. For example, vibrations in the same phase in the upper left arm 35 and the upper right arm 36 are damped by the suspension 40.

The damper 50 is attached between the upper arm 33 and the lower arm 34 to connect the upper right arm 36 of the upper arm 33 and the lower left arm 37 of the lower arm 34. In other words, when viewed from the front of the vehicle, the damper 50 is arranged in the substantially rectangular linkage 30 so that it crosses the head pipe 21.

The damper 50 is preferably a so-called through rod damper, for example, in which the piston 51 passes through the cylinder 52, as will be described in detail. One end of the piston 51 of the damper 50 is rotatably connected to the upper right arm 36 of the upper arm 33. The above-described end of the cylinder 52 is connected rotatably to the lower left arm 37 of the lower arm 34. Note that the damper 50 is located more on the front side of the vehicle than the head pipe 21 as shown in FIG. 1.

As described above, the damper 50 is used to connect the upper right arm 36 and the lower left arm 37 of the linkage 30, so that relative displacement between the upper right arm 36 and the lower left arm 37 is reduced. As described above, the damper 50 provides a damping force against the movement of the vehicle body frame 11 to tilt from its upright state to sideways. In this way, the damper 50 defines a lock that locks the operation of the linkage 30 and prevents the head pipe 21 from leaning as will be described, and damps vibrations that may cause relative displacement between the upper right arm 36 and the lower left arm 37 (i.e., vibrations in opposite phase).

Figure 3:
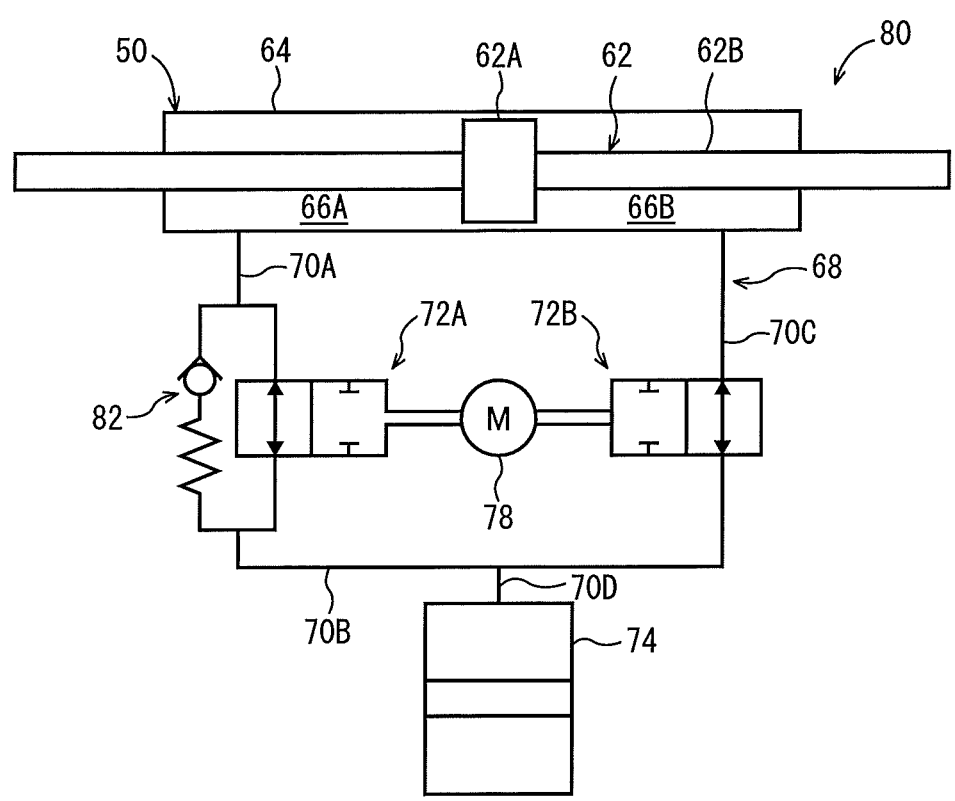
FIG. 3 is a diagram of a general structure of a damper.

As shown in FIG. 3, the damper 50 includes a piston 62 and a cylinder 64.

The piston 62 includes a piston main body 62A and a piston rod 62B. The piston main body 62A is located at an axial center portion of the piston rod 62B. The piston main body 62A is able to move in the cylinder 64. The piston rod 62B extends through the cylinder 64 in the axial direction. More specifically, the damper 50 is preferably a so-called through rod damper, for example.

The cylinder 64 stores operating oil. The inside of the cylinder 64 is partitioned into two spaces (a first space 66A and a second space 66B) by the piston main body 62A. The first and second spaces 66A and 66B are connected to each other by a damping circuit 68. Therefore, the operating oil is able to move between the first and second spaces 66A and 66B through the damping circuit 68.

The damping circuit 68 includes four flow paths 70A, 70B, 70C, and 70D, two flow regulators 72A and 72B, and one temperature compensating chamber 74. The flow regulator 72A is connected to the first space 66A through the flow path 70A. The flow regulator 72A is connected to the flow regulator 72B through the flow path 70B. The flow regulator 72B is connected to the second space 66B through the flow path 70C. The temperature compensating chamber 74 is connected to the flow path 70B through the flow path 70D.

The flow regulators 72A and 72B each include a valve element and a spring. The valve element is provided in a position to block a flow path in a switch valve 76 by the energizing force of the spring. Therefore, the operating oil is prevented from flowing in the damping circuit 68. More specifically, the operation of the damper 50 is prevented. When the operation of the damper 50 is prevented, the operation of the linkage 36 is prevented. In other words, the linkage 36 is locked.

An actuator 78 is, for example, a motor. The actuator 78 moves the valve element against the energizing force of the spring. At that time, the valve elements are in such a position that they do not block the flow paths in the flow regulators 72A and 72B. Therefore, the operating oil is allowed to flow in the damping circuit 68. More specifically, the operation of the damper 50 is allowed. When the damper 50 is allowed to operate, vibrations are damped. For example, if vibrations in opposite phases are generated in the lower left arm 44L and the upper right arm 42R, in other words, vibrations in opposite phases are generated in the pair of front wheels 14L and 14R, the damper 50 damps the vibrations. When the damper 50 is allowed to operate, the linkage 36 is allowed to operate. In other words, the linkage 30 is unlocked.

As can be clearly understood from the above description, the damper 50, the damping circuit 68, and the actuator 78 according to the present preferred embodiment define the lock 80.

Note that in the example shown in FIG. 3, a relief valve 82 is provided in parallel to the flow regulator 72A. The relief valve 82 prevents the internal pressure in the cylinder 64 from increasing when the operation of the damper 50 is prevented.

Figure 4:
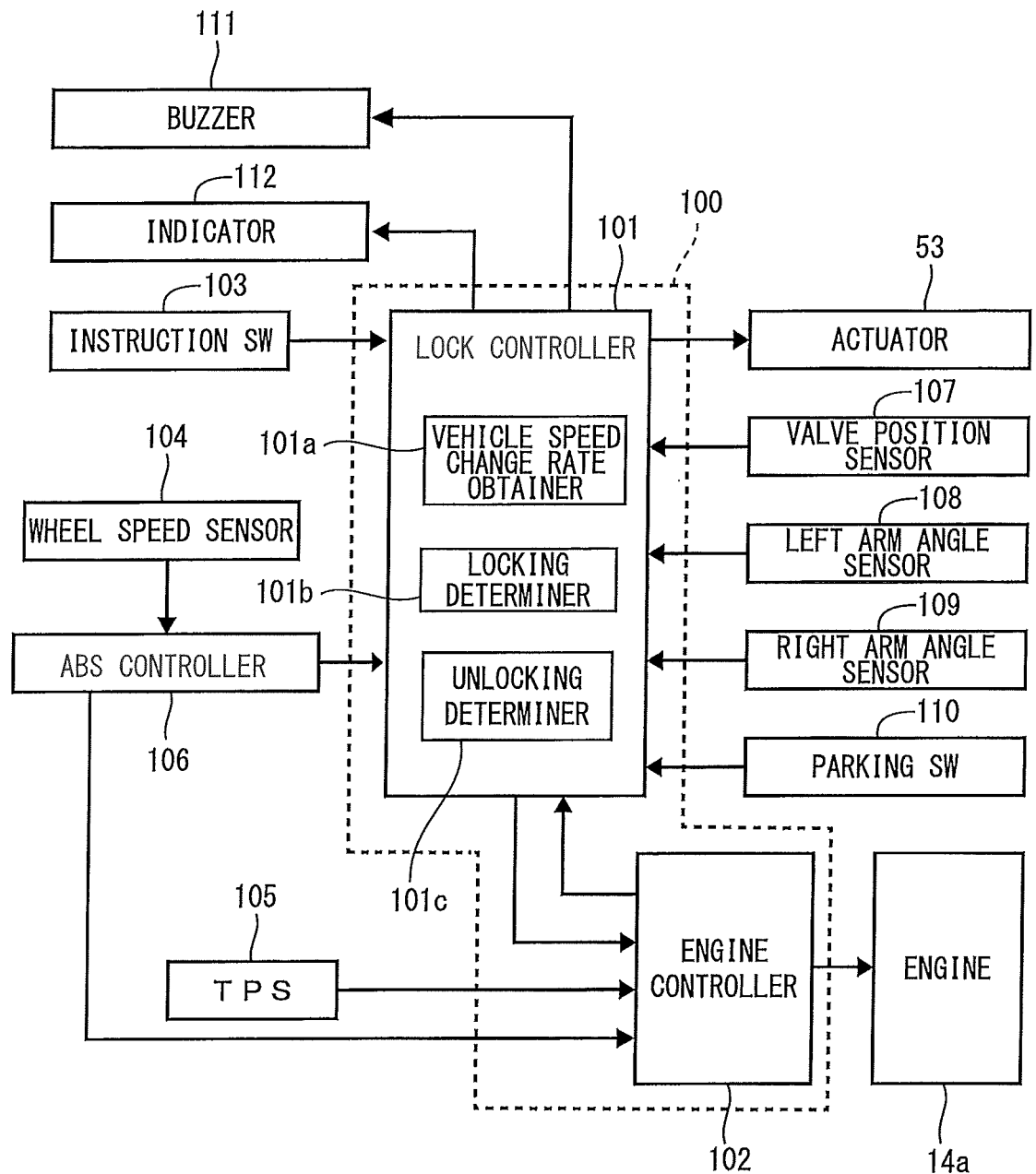
FIG. 4 is a block diagram for illustrating signals input/output to/from a lock controller.

A lock controller 101 that controls the operation of the damper 50 including the above-described structure using the lock 80 will be described by referring to FIG. 4.

The lock controller 101 is provided, for example, in a controller 100 that controls the engine 14a and other elements. More specifically, the controller 100 is configured or programmed to include the lock controller 101 that controls the operation of the damper 50 by the lock 80 and an engine controller 102 that controls driving of the engine 14a. Note that in the controller 100, signals are exchanged between the lock controller 101 and the engine controller 102.

The lock controller 101 locks the damper 50 if the vehicle speed, the vehicle speed change rate, and the throttle opening degree of the three-wheeled vehicle 1 are all equal to or less than thresholds in the locking condition and an instruction is input by an instruction switch 103 (instruction SW, instruction generator) provided on the handle 12. On the other hand, the lock controller 101 unlocks the damper 50 if at least one of the vehicle speed, the vehicle speed change rate, and the throttle opening degree of the three-wheeled vehicle 1 exceeds its threshold in the unlocking condition.

Therefore, an instruction signal output from the instruction switch 103, a vehicle speed signal output from a wheel speed sensor 104 (vehicle speed detector), and a throttle opening degree signal output from a throttle position sensor 105 (TPS, a throttle opening degree detector) are input to the lock controller 101. More specifically, the vehicle speed signal output from the wheel speed sensor 104 is input to an ABS controller 106 and then to the lock controller 101. The lock controller 101 calculates a vehicle speed change rate based on the input vehicle speed signal, as will be described. The throttle opening degree signal output from the throttle position sensor 105 is used to control the engine controller 102 and therefore input to the controller 100.

Note that signals output from a valve position sensor 107, a left arm angle sensor 108, and a right arm angle sensor 109 are input to the lock controller 101. The valve position sensor 107 detects the position of the valve elements in the flow regulators 72A and 72B of the damper 50. The position of the valve elements detected by the valve position sensor 107 is used to control opening/closing of the flow paths in the flow regulators 72A and 72B. Note that FIG. 4 shows the single valve position sensor 107 but the valve position sensor 107 is provided in each of the flow regulators. The left arm angle sensor 108 detects tilting of the upper left arm 35 and the lower left arm 37. The right arm angle sensor 109 detects tilting of the upper right arm 36 and the lower right arm 38. The tilt of the arms detected by the left arm angle sensor 108 and the right arm angle sensor 109 are used, for example, to prevent locking and unlocking of the damper 50.

An instruction signal output from a parking switch 110 (parking SW) is also input to the lock controller 101. The lock controller 101 locks the damper 50 using the lock 80 upon receiving an instruction signal as an input from the parking switch 110. This prevents the operation of the linkage 30.

The lock controller 101 outputs a driving signal to an actuator 53 of a damping circuit 55. The driving signal is output from the lock controller 101 when the damper 50 is switched between a locked state and an unlocked state, as will be described. The lock controller 101 also outputs a signal to a buzzer 111 and an indicator 112 when the damper 50 is switched between a locked state and an unlocked state or when the control stands by for an instruction signal to be output from the instruction switch 103.

The lock controller 101 is configured or programmed to include a vehicle speed change rate obtainer 101a, a locking determiner 101b, and an unlocking determiner 101c. The vehicle speed change rate obtainer 101a calculates a vehicle speed change rate using a vehicle speed input from the wheel speed sensor 104 through the ABS controller 106. The locking determiner 101b generates a driving signal used to lock the damper 50 if the three-wheeled vehicle 1 fulfills a prescribed locking condition. The unlocking determiner 101c generates a driving signal used to unlock the damper 50 if the three-wheeled vehicle 1 fulfills a prescribed unlocking condition. The locking condition and the unlocking condition will be described in detail.

The vehicle speed change rate obtainer 101a calculates a vehicle speed change rate using a vehicle speed output from the wheel speed sensor 104. More specifically, the vehicle speed change rate obtainer 101a obtains the difference between a vehicle speed detected by the wheel speed sensor 104 at a first time point and a vehicle speed detected by the wheel speed sensor 104 at a second time point and outputs the difference as a vehicle speed change rate. Here, the time difference between the first and second time points may be a unit time period or a prescribed time interval.

Note that the vehicle speed change rate obtainer 101a may be configured or programmed to differentiate a vehicle speed output from the wheel speed sensor 104 and obtain acceleration. In other words, the vehicle speed change rate obtainer 101a may have any configuration if it is able to calculate changes in the vehicle speed relative to changes in time.

Now, locking control carried out to switch the damper 50 to a locked state using the lock controller 101 including the above-described structure will be described by referring to the flowchart in FIG. 5.

Figure 5:
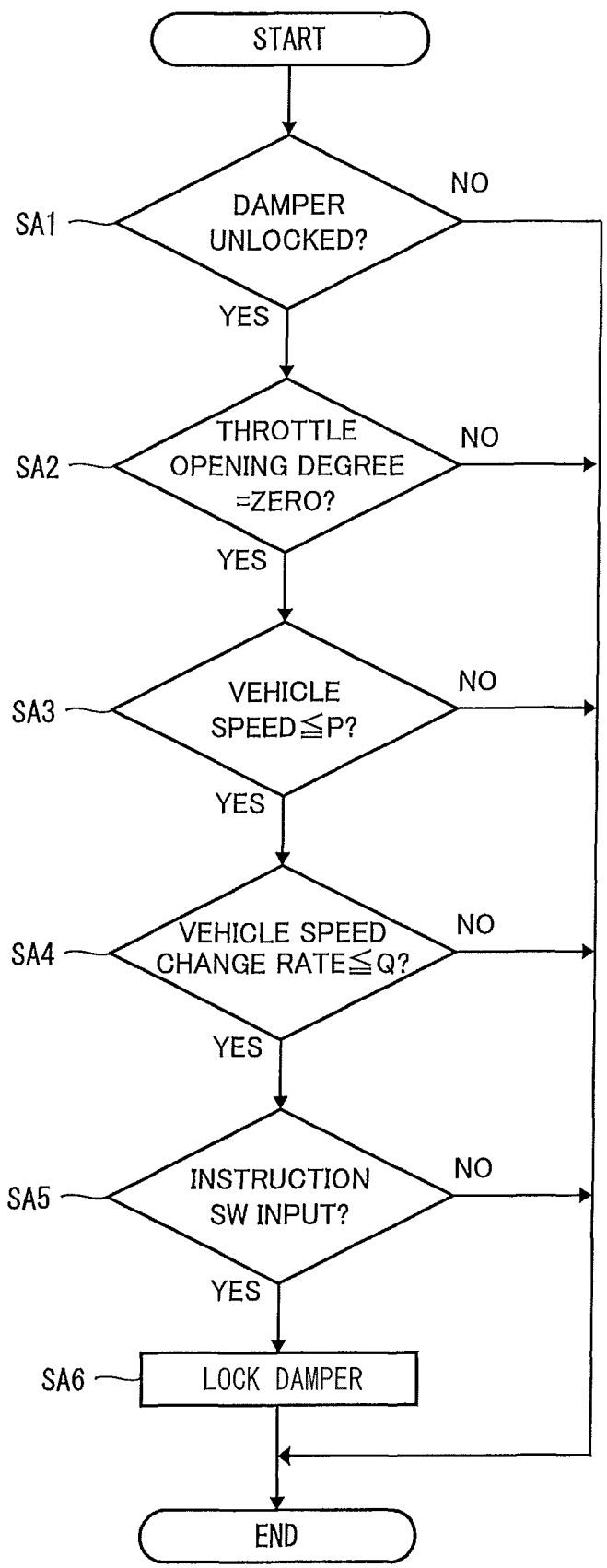
FIG. 5 is a flowchart for illustrating locking control carried out by the lock controller.

After the start of the flow in FIG. 5 (START), it is determined in step SA1 whether the damper 50 is in an unlocked state. Whether the damper 50 is in an unlocked state is determined based on the position of valve elements in the flow regulators 72A and 72B detected by the valve position sensor 107. If it is determined in step SA1 that the damper 50 is not in an unlocked state (NO) but in a locked state, the flow ends there (END).

On the other hand, if it is determined in step SA1 that the damper 50 is in an unlocked state (YES), the flow proceeds to step SA2 and it is then determined whether the throttle opening degree is zero. Whether the throttle opening degree is zero is determined based on a throttle opening degree signal detected by the throttle position sensor 105. Note that the state of the throttle opening degree being zero also applies to when the throttle opening degree is too low to provide the vehicle with any driving force. It may be determined in step SA2 whether the throttle opening degree is too low to provide the vehicle with any driving force instead of determining whether the throttle opening degree is zero.

If it is determined in step SA2 that the throttle opening degree is not zero (NO), the flow ends there (END). On the other hand, if it is determined in step SA2 that the throttle opening degree is zero (YES), the flow proceeds to the following step SA3 and it is determined whether the vehicle speed is equal to or lower than a threshold P. The threshold P is set to a lower vehicle speed than normal traveling speeds such as a vehicle speed immediately before the three-wheeled vehicle 1 stops.

If it is determined in step SA3 that the vehicle speed is greater than the threshold P (NO), the flow ends there (END). On the other hand, if it is determined in step SA3 that the vehicle speed is equal to or lower than the threshold P (YES), the flow proceeds to step SA4 and it is determined whether the vehicle speed change rate of the vehicle is equal to or lower than a threshold Q. The threshold Q is set to a lower value than those during normal traveling such as a value immediately before the three-wheeled vehicle 1 stops.

If it is determined in step SA4 that the vehicle speed change rate is greater than the threshold Q (NO), the flow ends there (END). On the other hand, if it is determined in step SA4 that the vehicle speed change rate is equal to or lower than the threshold Q (YES), the flow proceeds to step SA5 and it is determined if there is an input instruction by the instruction switch 103. The presence/absence of the input instruction by the instruction switch 103 is determined based on detection of an instruction signal output from the instruction switch 103.

If it is determined in step SA5 that there is not an input instruction by the instruction switch 103 (NO), the flow ends there (END). On the other hand, if it is determined in step SA5 that there is an input instruction by the instruction switch 103 (YES), the flow proceeds to step SA6 and a driving signal used to lock the damper 50 is generated.

Note that the instruction switch 103 is configured to continue to output an instruction signal while there is an input to the switch. Therefore, if the throttle opening degree, the vehicle speed, and the vehicle speed change rate satisfy the locking condition while the input instruction by the instruction switch 103 continues (YES in steps SA2 to SA4), the result of determination in step SA5 is YES, and the flow proceeds to step SA6. Therefore, the damper 50 is locked more quickly than when the rider carries out input instruction to the instruction switch 103 after determining that the throttle opening degree, the vehicle speed, and the vehicle speed change rate satisfy the locking condition.

As in the foregoing, the lock controller 101 locks the damper 50 from its unlocked state if the throttle opening degree is zero, the vehicle speed and the vehicle speed change rate are not more than the thresholds and input instruction by the instruction switch 103 is present. In this way, the damper 50 is locked when not only the throttle opening degree and the vehicle speed but also the vehicle speed change rate satisfies the locking condition, so that the damper 50 is locked only when it is surely determined that the vehicle is about to immediately stop. Therefore, the above-described structure allows the linkage 30 to be quickly locked immediately before the vehicle stops.

In the above-described structure, the damper 50 is not locked unless the throttle opening degree and the vehicle speed as well as the vehicle speed change rate satisfy the locking condition when, for example, the vehicle speed of the three-wheeled vehicle 1 gradually increases on a downward slope. In this way, the linkage 30 is surely prevented from being locked when the three-wheeled vehicle 1 starts on a downward slope.

Note that in the above-described example of locking control, an input instruction by the instruction switch 103 is preferably necessary in order to lock the damper 50 using the lock 80. However, the damper 50 may be locked using the lock 80 without an input instruction by the instruction switch 103 if the throttle opening degree, the vehicle speed, and the vehicle speed change rate satisfy the locking condition.

Now, unlocking control used to switch the damper 50 to an unlocked state using the lock controller 101 including the above-described structure will be described by referring to the flowchart in FIG. 6.

Figure 6:
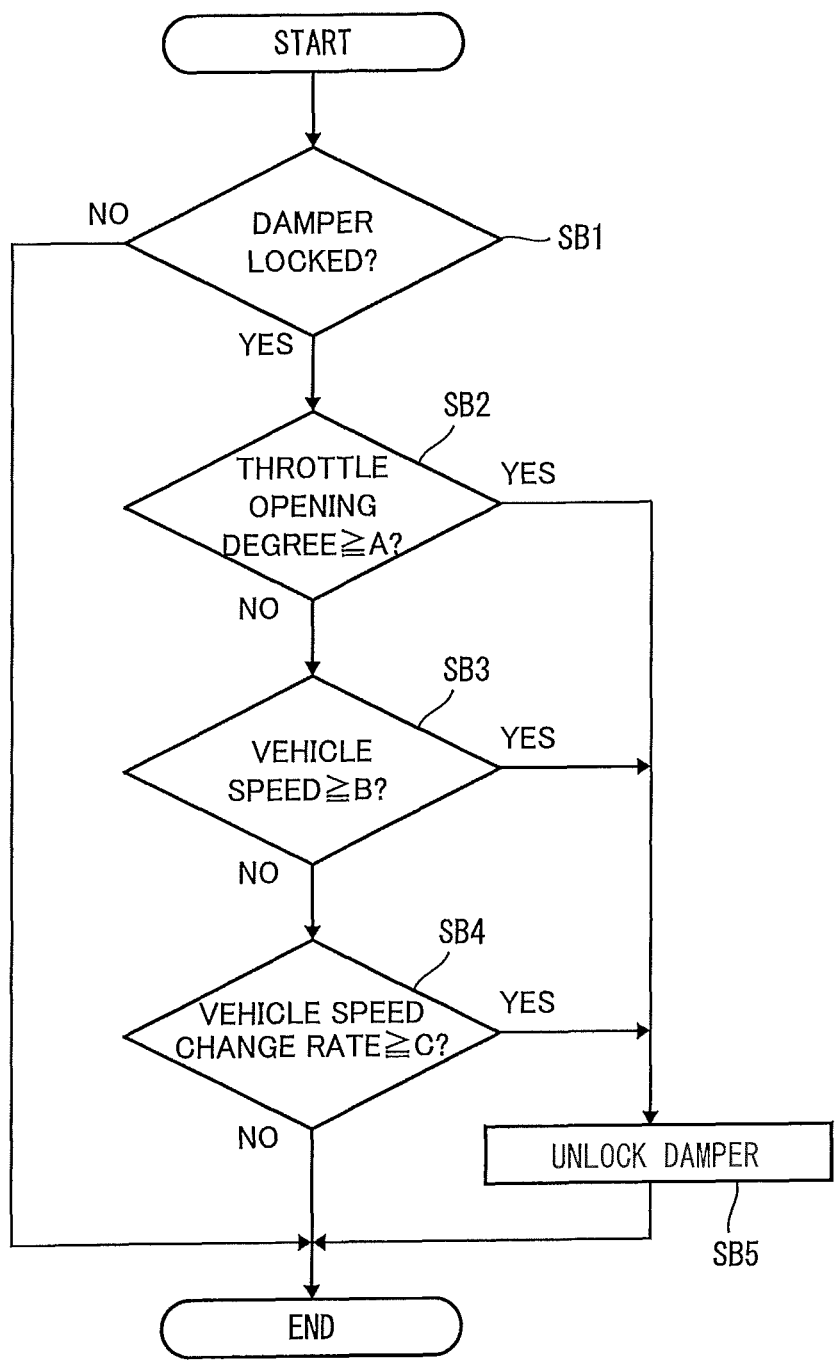
FIG. 6 is a flowchart for illustrating unlocking control carried out by the lock controller.

At the start of the flow in FIG. 6 (START), it is determined in step SB1 whether the damper 50 is locked. Whether the damper 50 is locked is determined based on the position of the valve elements in the flow regulators 72A and 72B detected by the valve position sensor 107. If it is determined in step SB1 that the damper 50 is not in a locked state (NO) but in an unlocked state, the flow ends there (END).

On the other hand, if it is determined in step SB1 that the damper 50 is in a locked state (YES), the flow proceeds to step SB2 and it is determined whether the throttle opening degree is equal to or more than a threshold A. Whether the throttle opening degree is equal to or more than the threshold A is determined based on a throttle opening degree signal detected by the throttle position sensor 105. Note that the threshold A is set to a throttle opening degree based on how the acceleration of the vehicle is determined, such as a throttle opening degree when the vehicle starts.

If it is determined in step SB2 that the throttle opening degree is equal to or more than threshold A (YES), the flow proceeds to step SB5 and a driving signal used to unlock the damper 50 is generated. On the other hand, if it is determined in step SB2 that the throttle opening degree is less than the threshold A (NO), the flow proceeds to the following step SB3 and it is determined whether the vehicle speed is equal to or more than a threshold B. Note that the threshold B is set to a prescribed vehicle speed based on how the vehicle speed is determined.

If it is determined in step SB3 that the vehicle speed is equal to or more than the threshold B (YES), the flow proceeds to step SB5 and a driving signal used to unlock the damper 50 is generated. On the other hand, if it is determined in step SB3 that the vehicle speed is less than the threshold B (NO), the flow proceeds to the following step SB4 and it is determined whether the vehicle speed change rate of the vehicle is equal to or more than a threshold C (a predetermined value). Note that the threshold C is set to a prescribed value based on how it is determined that the vehicle accelerates as it travels.

If it is determined in step SB4 that the vehicle speed change rate is equal to or more than the threshold C (YES), the flow proceeds to step SB5 and a driving signal used to unlock the damper 50 is generated. On the other hand, if it is determined in step SB4 that the vehicle speed change rate is less than the threshold C (NO), the flow ends there (END).

The driving signal used to unlock the damper 50 is generated in step SB5 and then the flow ends (END).

As in the foregoing, the lock controller 101 unlocks the damper 50 from a locked state if the throttle opening degree is not less than the threshold A, the vehicle speed is not less than the threshold B, or the vehicle speed change rate is not less than the threshold C. The vehicle speed change rate is taken into consideration in this way, so that the damper 50 is unlocked more quickly than the case of unlocking the damper 50 in consideration of the throttle opening degree and the vehicle speed.

In addition, the above-described structure allows the damper 50 to be unlocked more quickly and surely if, for example, the three-wheeled vehicle 1 starts on a downward slope. More specifically, if the three-wheeled vehicle 1 starts on a downward slope, the vehicle would gradually accelerate even though the throttle opening degree is small and the vehicle speed is low. Even in such a case, if the damper 50 is unlocked in consideration of the vehicle speed change rate of the three-wheeled vehicle 1 as described above, the linkage 30 is unlocked quickly and surely as the three-wheeled vehicle 1 starts.

Figure 7A:
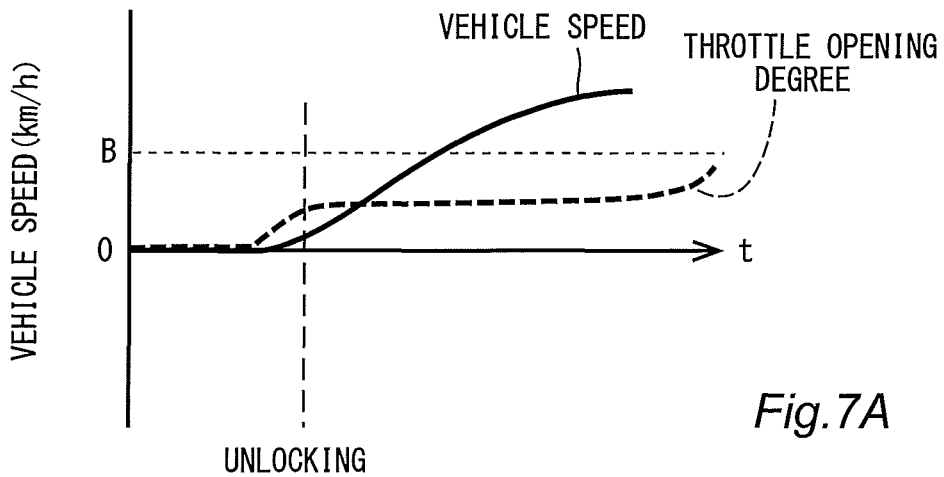
FIG. 7A is a schematic diagram showing a relationship between changes in the vehicle speed and unlocking of the damper when the three-wheeled vehicle starts on flat land.
Figure 7B:
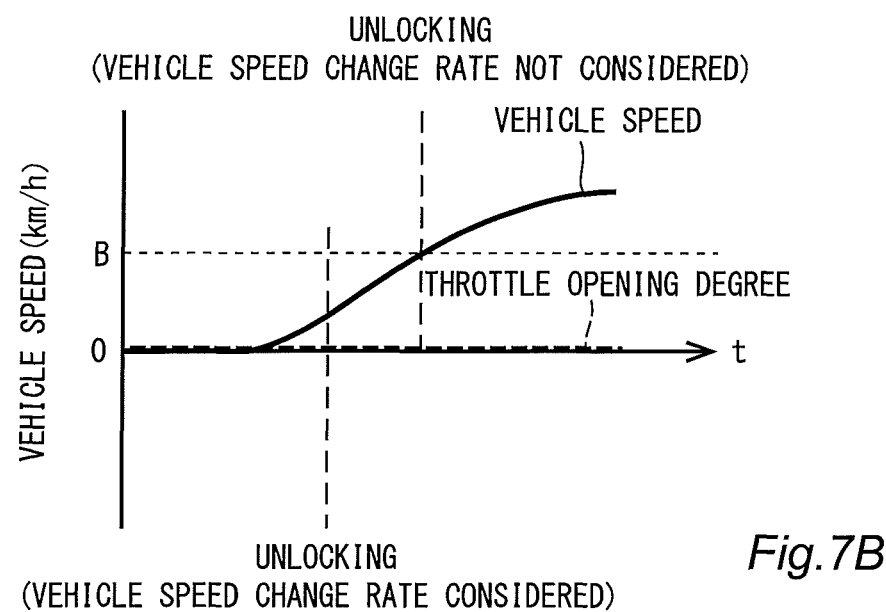
FIG. 7B is a schematic diagram showing a relationship between changes in the vehicle speed and unlocking of the damper when the three-wheeled vehicle starts on a downward slope.

FIG. 7A shows timing in which the damper 50 is switched to an unlocked state as the three-wheeled vehicle 1 starts on a flat road. FIG. 7B shows timing in which the damper 50 is switched to an unlocked state as the three-wheeled vehicle 1 starts on a downward slope.

As shown in FIGS. 7A and 7B, if the vehicle speed change is substantially the same for both cases in which the vehicle starts, the throttle opening degree is greater as the vehicle starts on the flat road (FIG. 7A), and therefore the throttle opening degree is not less than the threshold A, which satisfies the unlocking condition. On the other hand, if the three-wheeled vehicle 1 starts on the downward slope, the throttle opening degree hardly changes and the vehicle speed mildly increases. Therefore, if only the throttle opening degree and the vehicle speed are taken into consideration (with no consideration of the vehicle speed change rate), the damper 50 is not unlocked until the vehicle speed is equal to or more than the threshold B.

In contrast, the damper 50 is unlocked additionally in consideration of the vehicle speed change rate of the three-wheeled vehicle 1 as described above, so that the damper 50 is unlocked when the vehicle speed change rate reaches the threshold C or more before the vehicle speed becomes the threshold B or more. Therefore, the lock controller 101 including the above-described structure is able to detect the start of the three-wheeled vehicle 1 more quickly and surely than the case of considering the throttle opening degree and the vehicle speed. Therefore, the damper 50 is switched to an unlocked state quickly and surely in response to the start of the three-wheeled vehicle 1.

Note that in the above-described example of unlocking control, the lock controller 101 switches the damper 50 to an unlocked state if the throttle opening degree, the vehicle speed, or the vehicle speed change rate satisfies the unlocking condition (YES in any of steps SB2 to SB4). However, the lock controller 101 may be configured or programmed to switch the damper 50 to an unlocked state in response to input instruction by the instruction switch 103 if any of the throttle opening degree, the vehicle speed, and the vehicle speed change rate does not satisfy the unlocking condition.

According to the present preferred embodiment, the vehicle includes the engine 14a, the vehicle body frame 11, the left and right front wheels 3, the linkage 30 that connects the left and right front wheels 3 to the vehicle body frame 11, the lock 80 that locks the linkage 30 by preventing operation of the linkage 30 and unlocks the linkage 30 by allowing the linkage 30 to operate, the lock controller 101 that controls locking and unlocking of the linkage 30 by the lock 80, the wheel speed sensor 104 that detects a vehicle speed, and the vehicle speed change rate obtainer 101a that obtains a vehicle speed change rate. The lock controller 101 unlocks the linkage 30 via the lock 80 if the linkage 30 is in a locked state and at least one of the vehicle speed detected by the wheel speed sensor 104 and the vehicle speed change rate obtained by the vehicle speed change rate obtainer 101a satisfies the unlocking condition.

In this way, when the linkage 30 is unlocked, not only the vehicle speed but also the vehicle speed change rate is considered, so that the start of the vehicle is detected more surely and the linkage 30 is unlocked quickly. More specifically, if the unlocking condition is based on the vehicle speed, the threshold would be set to a relatively large value so that the linkage 30 is not unlocked while the rider walks the vehicle. In this case, the linkage 30 is not unlocked until the vehicle speed reaches the threshold. In contrast, not only the vehicle speed but also the vehicle speed change rate is considered as the unlocking condition, so that the linkage 30 is unlocked quickly when the vehicle speed change rate satisfies the unlocking condition.

If, for example, the vehicle starts on a downward slope, the start of the vehicle may be determined precisely based on the vehicle speed change rate. Therefore, the linkage 30 is unlocked quickly when the vehicle starts on a downward slope.

Therefore, the linkage 30 is unlocked more quickly at the start of the vehicle than the conventional way of determining an unlocking condition based on the vehicle speed, and the linkage 30 is unlocked quickly if the vehicle starts on a downward slope.

According to the present preferred embodiment, if the vehicle speed change rate is equal to or more than a prescribed value, the unlocking condition is fulfilled. The lock controller unlocks the linkage 30 via the lock 80 if the linkage 30 is locked and the vehicle speed change rate obtained by the vehicle speed change rate obtainer 101a is equal to or more than the prescribed value.

The linkage 30 is unlocked using the lock 80 if the vehicle speed change rate is equal to or more than the prescribed value, so that the linkage 30 is unlocked more surely at the start of the vehicle.

According to the present preferred embodiment, the vehicle speed change rate obtainer 101a outputs the difference between a vehicle speed detected by the wheel speed sensor 104 at a first time point and a vehicle speed detected at a second time point by the wheel speed sensor 104 as the vehicle speed change rate. In this way, a vehicle speed change rate is obtained more readily than the case of obtaining a vehicle speed change rate by differentiating a vehicle speed.

Note that the vehicle speed change rate obtainer 101a may output a derivative value of a vehicle speed detected by the vehicle speed detector as the vehicle speed change rate.

According to the present preferred embodiment, the three-wheeled vehicle 1 further includes the throttle position sensor 105 that detects a throttle opening degree of the engine 14a. The lock controller 101 unlocks the linkage 30 via the lock 80 if the linkage 30 is locked by the lock 80 and the throttle opening degree detected by the throttle position sensor 105 satisfies the unlocking condition.

When the unlocking condition is based on the vehicle speed, the threshold would be set to a relatively large value so that the linkage is not unlocked while the rider walks the vehicle. In this way, the linkage 30 is not unlocked because the vehicle speed is less than the threshold even if the rider operates the throttle grip to raise the engine speed and the vehicle starts to travel. In contrast, when the throttle opening degree is also taken into consideration as described above, the linkage 30 is unlocked when the rider operates the throttle grip. Therefore, it is less likely that the linkage 30 is not unlocked though the vehicle is traveling.

In addition, when the linkage 30 is unlocked in consideration of the throttle opening degree, the linkage is unlocked quickly before the vehicle speed change rate increases upon starting the vehicle.

According to the present preferred embodiment, the three-wheeled vehicle 1 further includes a throttle position sensor 105 that detects a throttle operation degree of the engine 14a. The lock controller 101 locks the linkage 30 via the lock 80 if the linkage 30 is unlocked and a throttle opening degree detected by the throttle position sensor 105, a vehicle speed detected by the wheel speed sensor 104, and a vehicle speed change rate obtained by the vehicle speed change rate obtainer 101a satisfy the locking condition.

When all of the throttle opening degree, the vehicle speed, and the vehicle speed change rate satisfy the locking condition, the linkage 30 is locked, so that the linkage 30 is locked only if it is determined for sure that the vehicle is to stop immediately afterwards. Therefore, in this way, the linkage 30 is locked quickly immediately before the vehicle stops. Also in this way, if the throttle opening degree and the vehicle speed satisfy the locking condition as the vehicle speed of the three-wheeled vehicle 1 gradually increases, for example, on a downward slope, the linkage 30 is not locked unless the vehicle speed change rate satisfies the locking condition. Therefore, the linkage 30 is surely prevented from being locked when the vehicle starts on a downward slope.

According to the present preferred embodiment, the three-wheeled vehicle 1 further includes the instruction switch 103 that outputs an instruction signal to instruct the lock controller 101 to unlock the linkage 30 via the lock 80. In response to the instruction signal input from the instruction switch 103, the lock controller 101 unlocks the linkage 30 via the lock 80 when the linkage 30 is locked.

In response to the instruction signal output from the instruction switch 103, the linkage 30 is unlocked by the lock 80. Therefore, the linkage 30 is easily unlocked by the lock 80.

According to the present preferred embodiment, the three-wheeled vehicle 1 further includes the instruction switch 103 that outputs an instruction signal to instruct the lock controller 101 to lock the linkage 30 by the lock 80. While the linkage 30 is unlocked and the instruction signal from the instruction switch 103 is input, the lock controller 101 locks the linkage 30 via the lock 80 in response to a transition from the state in which none of the vehicle speed change rate, the throttle opening degree, and the vehicle speed satisfies the locking condition to the state in which all of them satisfy the locking condition.

In this way, the linkage 30 is locked when the vehicle speed change rate, the throttle opening degree, and the vehicle speed satisfy the locking condition while the instruction by the instruction switch 103 is input without having to determine if the vehicle speed change rate, the throttle opening degree, and the vehicle speed satisfy the locking condition. More specifically, the rider inputs an instruction by the instruction switch 103 in advance, so that the linkage 30 is locked when these values satisfy the locking condition. Therefore, in this way, the linkage 30 is locked quickly as compared to the case of inputting the instruction by the instruction switch 103 after determining that the values satisfy the locking condition.

According to the present preferred embodiment, the three-wheeled vehicle 1 further includes the damper 50 that damps vibrations in opposite phases in the left and right front wheels 3. The lock 80 is able to lock the operation of the damper 50.

In this way, using the damper 50 that damps vibrations in opposite phases caused at the left and right front wheels 3, the lock 80 is able to lock the operation of the linkage 30. Since an additional lock is not necessary, the three-wheeled vehicle 1 is compact and inexpensive.

The preferred embodiments of the present invention have been described but are only exemplary to show examples of how the present invention is carried out. Therefore, the present invention is not limited by the description of the preferred embodiments and modifications may be made to the preferred embodiments without departing from the scope of the present invention.

According to the preferred embodiments described above, a so-called through rod damper in which the piston rod 62B penetrates through the ends of the cylinder 64 is preferably used as the damper 50, a left damper 110, and a right damper 120. However, the damper may be a damper other than the through rod damper.

According to the preferred embodiments described above, the linkage 30 is preferably a so-called double wish bone linkage in which the left and right arms connected to the left knuckle arm 31 and the right knuckle arm 32, respectively are discrete members and the arms are rotatably connected to the head pipe 21. However, the linkage may be any other type such as a parallel linkage in which coupling members that extend along the sides of the vehicle connects the left knuckle arm 31 and the right knuckle arm 32.

According to the preferred embodiments described above, the damper 50 is preferably provided between the lower left arm 37 and the upper right arm 36 of the linkage 30. However, the damper 50 may be provided in any position between the upper left arm 35 and the lower right arm 38, between other arms, or between any of the arms and the vehicle body frame 11 where vibrations in opposite phases in the left and right front wheels 3 are able to be damped.

According to the preferred embodiments described above, the lock controller 101 is preferably configured or programmed to control locking or unlocking using the throttle opening degree signal output from the throttle position sensor 105. However, the lock controller 101 may control locking or unlocking using any value corresponding to the throttle opening degree such as a detection result of the rotation angle of the throttle grip. Therefore, the throttle opening degree detector may be another type of detector other than a throttle position sensor if the detector is able to detect a value corresponding to the throttle opening degree.

According to the preferred embodiments described above, the vehicle speed change rate is preferably calculated by the vehicle speed change rate obtainer 101a of the lock controller 101. However, the acceleration of the vehicle may be detected and the lock controller 101 may control locking or unlocking using the result of detection.

According to the preferred embodiments described above, the wheel speed sensor 104 is preferably used to detect the vehicle speed of the three-wheeled vehicle 1. However, any sensor other than the wheel speed sensor 104 may be used if the sensor is able to detect the vehicle speed of the three-wheeled vehicle 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle riding vehicle comprising:
   an engine;
   a vehicle body frame;
   left and right front wheels;
   a linkage that connects the left and right front wheels to the vehicle body frame;
   a lock that locks the linkage by preventing operation of the linkage and unlocks the linkage by allowing the linkage to operate;
   a lock controller that controls locking and unlocking of the linkage by the lock;
   a vehicle speed detector that detects a vehicle speed; and
   a vehicle speed change rate obtainer that obtains a vehicle speed change rate; wherein
   the lock controller determines, based on the vehicle speed alone, whether the vehicle speed detected by the vehicle speed detector satisfies a first unlocking condition;
   the lock controller determines, based on the vehicle speed change rate alone, whether the vehicle speed change rate obtained by the vehicle speed change rate obtainer satisfies a second unlocking condition;
   the second unlocking condition is satisfied when the vehicle speed change rate is equal to or more than a threshold that is a predetermined and fixed vehicle speed change rate value that does not change with respect to the vehicle speed; and
   the lock controller unlocks the linkage via the lock if the linkage is locked by the lock and the lock controller determines that at least one of the first unlocking condition and the second unlocking condition is satisfied.

2. The saddle riding vehicle according to claim 1, wherein the vehicle speed change rate obtainer outputs a difference between a vehicle speed detected by the vehicle speed detector at a first point in time and a vehicle speed detected by the vehicle speed detector at a second point in time, or a derivative value of a vehicle speed detected by the vehicle speed detector as the vehicle speed change rate.

3. The saddle riding vehicle according to claim 1, further comprising a throttle opening degree detector that detects a value corresponding to a throttle opening degree of the engine, wherein the lock controller unlocks the linkage via the lock if the linkage is locked by the lock and the value corresponding to the throttle opening degree detected by the throttle opening degree detector satisfies a third unlocking condition.

4. The saddle riding vehicle according to claim 1, further comprising an instruction generator that outputs an instruction signal that instructs the lock controller to unlock the linkage via the lock, wherein the lock controller unlocks the linkage via the lock in response to the instruction signal supplied by the instruction generator if the linkage is in a locked state.

5. The saddle riding vehicle according to claim 1, further comprising a damper that damps vibrations in opposite phases in the left and right front wheels, wherein the lock locks operation of the damper.

6. The saddle riding vehicle according to claim 1, further comprising a throttle opening degree detector that detects a value corresponding to a throttle opening degree of the engine, wherein the lock controller locks the linkage via the lock if the linkage is unlocked and the value corresponding to the throttle opening degree detected by the throttle opening degree detector, the vehicle speed detected by the vehicle speed detector, and the vehicle speed change rate obtained by the vehicle speed change rate obtainer satisfy a locking condition.

7. The saddle riding vehicle according to claim 6, further comprising an instruction generator that outputs an instruction signal that instructs the lock controller to lock the linkage via the lock, wherein the lock controller locks the linkage by the lock in response to a transition from a state in which none of the vehicle speed change rate, the value corresponding to the throttle opening degree, and the vehicle speed satisfies the locking condition to a state in which all of the vehicle speed change rate, the value corresponding to the throttle opening degree, and the vehicle speed satisfy the locking condition while the linkage is in an unlocked state and the instruction signal is supplied by the instruction generator.

\* \* \* \* \*